United States Patent [19]

Hartshorn

[11] Patent Number: 5,196,180

[45] Date of Patent: Mar. 23, 1993

[54] CERAMIC POWDERS

[75] Inventor: Angus J. Hartshorn, Pascoe Vale South, Australia

[73] Assignee: ICI Australia Operations Proprietary Limited, Melbourne, Australia

[21] Appl. No.: 689,289

[22] PCT Filed: Oct. 3, 1989

[86] PCT No.: PCT/AU89/00425

§ 371 Date: Jun. 13, 1991

§ 102(e) Date: Jun. 13, 1991

[87] PCT Pub. No.: WO90/03838

PCT Pub. Date: Apr. 19, 1990

[30] Foreign Application Priority Data

Oct. 13, 1988 [AU] Australia ............................. PJ 0949

[51] Int. Cl.$^5$ .......................... C01F 7/02; C01G 25/00
[52] U.S. Cl. .................................. 423/593; 423/600;
423/608; 501/103; 501/127
[58] Field of Search ................ 501/103, 127; 423/600,
423/593, 608

[56] References Cited

U.S. PATENT DOCUMENTS

| | | | |
|---|---|---|---|
| 3,082,103 | 3/1963 | Wainer | 501/104 |
| 4,179,408 | 12/1979 | Sanchez et al. | 423/628 |
| 4,540,677 | 9/1985 | Enomoto et al. | 501/103 |
| 4,713,233 | 12/1987 | Marsh et al. | 423/608 |
| 4,746,468 | 5/1988 | Ozaki et al. | 264/9 |
| 4,769,351 | 9/1988 | Soumiya et al. | 501/105 |
| 4,999,323 | 3/1991 | Sang et al. | 501/103 |

Primary Examiner—Mark L. Bell
Assistant Examiner—Deborah Jones
Attorney, Agent, or Firm—Cushman, Darby & Cushman

[57] ABSTRACT

A process for preparing ceramic powders suitable for pressing into articles comprises the dispersing of a particulate ceramic, preferably of particle size below 1 μm, in water in the presence of ammonia or an alkylamine having a boiling point below that of water and spray-drying the dispersion to give powders. The process is particularly applicable to zirconia and gives rise to fine, free-flowing powders which can be processed into articles of uniform density.

2 Claims, No Drawings

CERAMIC POWDERS

This invention relates to the production of ceramic powders for pressing.

Recent interest in the use of high-purity ceramics such as zirconia for a variety of specialised end uses has led to a demand for high grade ceramic powders. Ceramic components are commonly made by the dry pressing of such powders, and use of a high grade powder suitable for such a process (hereinafter referred to as a "pressing powder") will result in components which are free of large pores and uniformly dense. In order to achieve these ends, the pressing powders must be fine, free-flowing and as free as is practicable from non-uniform shapes. Uniformly dense spheres are desirable because they will give the most free-flowing highest bulk density powders. On pressing, such a powder will more readily form a "green" body with a uniform pore size than will a powder which is not uniform in density. Failure to achieve these properties to an acceptable degree will result in a ceramic article which will exhibit inferior performance.

A common method of preparing ceramic pressing powders is spray drying. In this method, a dispersion of a ceramic material such as zirconia of a controlled particle size is dispersed in water in the presence of a suitable surfactant and then sprayed to give a fine pressing powder which consists essentially of loose spheroidal aggregates of particles. These can then be loaded to a die and pressed to give a "green" body prior to firing. Before spray drying, there may be added other materials such as binders and plasticisers, these additives helping control the strength and uniformity of the "green" body. The problem with this approach is the fact that there remains with the particles the surfactant residues. The presence of such residues reduces the overall properties of the final articles, yet these residues are both difficult and expensive to get rid of.

It has now been found that this can be avoided and that it is possible to make a high-grade ceramic pressing powder which has a reduced content of organic residues and may even be free of them. There is therefore provided, according to the present invention, a process of preparing a ceramic powder suitable for pressing into articles by the steps of (a) dispersing a particulate ceramic in water in the presence of ammonia or an alkylamine having a boiling point below that of water, present in a quantity sufficient to disperse the ceramic; and (b) spray-drying the resulting dispersion to give a ceramic powder.

The particulate ceramics suitable for use in this invention may be any of those which are useful in the production of ceramic articles. The most common of these are the various types of stabilised or partially stabilised zirconium dioxide, but other ceramic oxides such as alumina can also be used. The mean particle size should be small, 1.0 um maximum.

The process consists of the steps of dispersing a particulate ceramic and then spray drying the dispersion to give a pressing powder. The dispersion is carried out in the presence of a quantity of ammonia or an alkylamine having a boiling point below that of water. There was described in co-pending PCT Application PCT/AU89/00242 a grinding process for ceramics where there was disclosed the surprising discovery that ammonia and volatile alkylamines could be used as dispersants for ceramic powders. The same types of alkylamines which were useful in that invention, i.e. compounds of the formula $NR^1R^2R^3$, where $R^1$, $R^2$ and $R^3$ are selected from hydrogen and $C_1$–$C_4$ alkyl groups, at least one of $R^1$, $R^2$ and $R^3$ being an alkyl group, are also useful in this invention. Again, ammonia is preferred because of its cheapness and relatively low toxicity.

The quantity of ammonia or alkylamine necessary for the dispersion of the particulate ceramic cannot be stated with any degree of precision as the concentrations of particulate ceramic and evaporation rate of ammonia or alkylamine vary considerably. Sufficient dispersant is added to suspend whatever particulate ceramic is used—the skilled person can readily ascertain this. Other required materials such as binders and plasticisers may be added at this part of the process.

The dispersion is then spray dried. The technology of spray drying is well known to the art; it is typically carried out by spraying through a nozzle or a rotary atomiser into a hot drying chamber. Examples of commercial spray drying equipment are the "Niro" Production Minor and the "Buchi" 190 Mini spray dryers.

One of the great advantages of this process is that the dispersant is volatile and thus is lost during the spray drying process, meaning of course that there is one less organic residue which must be removed. A further and most surprising advantage is the highly desirable nature of the particulates resulting from the spray drying process. These particulates are unusually fine aggregates of particles of very uniform density and they make excellent pressing powders.

The nature of these particles leads to a further major advantage. It has been found that, provided that the ceramic articles to be manufactured by pressing are neither very large or very complex in shape, it is possible to leave out the hitherto indispensable binders and plasticisers and have a completely organic residue-free ceramic article. In the art, it is well known that the only way to rid ceramic parts of such organic residues is prolonged high temperature heating (usually known as "binder burnout"). This is no longer necessary for many applications when ceramic pressing powders produced according to the process of the present invention are used. For large and more complex parts, some binder and associated plasticiser are still needed, but the quantity required is smaller and the problems of their eventual removal are therefore also smaller.

The process of this invention can be conveniently used in combination with the processes disclosed in co-pending applications AU23770/88 and PCT/AU89/00242 provide a complete method for the production of ceramic pressing powders, starting with crude powder.

The invention is further illustrated by the following examples in which all parts are expressed by weight.

EXAMPLE 1

Preparation of a zirconia pressing powder and of a ceramic article therefrom.

6000 parts of powder of zirconia which contained 3 mole % $Y_2O_3$ was ground in an attritor with 3380 parts of water and 120 parts of ammonia until 50% of the particles had a size of less than 0.28 um. The resultant dispersion had a viscosity of 6 mPa.S and a near-Newtonian rheology.

The dispersion was spray dried in a "Niro" (trade mark) Production Minor spray dryer with an inlet temperature of 350° C. and an outlet temperature of 115° C. The average agglomerate size of the product was 60 um and the agglomerates were spherical and when sectioned were found to be of uniform internal density.

The powder prepared as hereinabove described was uniaxially pressed into bars of dimensions 5×5×50 mm at a pressure of 15 MPa. The bars were then isostatically pressed at 200 MPa and fired to 1500° C. with a constant heating rate of 1 deg. C. per minute. They were held at this temperature for 2 hours followed by a return to ambient temperature at a rate of 300 deg. C. per hour. The bars were surface ground and their edges chamfered.

The density of the ceramic was measured by the Archimedes method at 6.07 g/cm$^3$ (about 99.5% of theoretical). A polished surface exhibited hardly any porosity, and the flexural strength as measured by a four point bend test at a crosshead speed of 0.25 mm/min. was 1110±150 MPa.

EXAMPLE 2

An example showing the use of a conventional dispersant in the preparation of a zirconia pressing powder and the results achieved.

The process of powder preparation as described in Example 1 was followed except that the dispersant used was an ammonium polyacrylate ("Dispex" (trade mark) A40 ex Allied Colloids Inc. was the actual material used). 150 parts of this dispersant was used and 3850 parts of water was used in the grinding stage. The result was a dispersion of fine particle size of viscosity 5 mPa.S and near-Newtonian rheology.

This dispersion was spray-dried under exactly the same conditions as those of Example 1. The end product was a pressing powder which comprised agglomerates of average diameter 50 um and of toroidal shape.

Ceramic bars were prepared from this pressing powder in the same manner as described in Example 1. The sintered density of the product was 5.94 g/cm$^3$ (97.4% of theoretical). Microscopic examination of a polished surface revealed that pressing conditions has not been able to deform all of the agglomerates and the original toroidal shape could still be seen. The surface also exhibited an appreciably higher porosity and the flexural strength of the material was 733±59 MPa, only 66% of that of the material of Example 1.

EXAMPLE 3

Illustration of the utility of the invention in making parts of various dimensions.

500 g of the powder prepared as described in Example 1 was isostatically pressed at 200 MPa in a cylindrical mould. The resulting green body was of 7.77 cm height and 5.19 cm diameter and had a density of 3.10 g/cm$^3$. This was fired using the conditions of Example 1—these, it will be appreciated, are much faster than is normally applied in the art for bodies containing organic additives.

The final body had a diameter of approximately 4 cm, a height of approximately 6 cm and a sintered density of 6.07 g/cm$^3$.

The experiment was repeated with an approximately 2 g sample. The final dimensions were approximately 0.9 cm diameter and 0.5 cm height and the sintered density was found to be identical to that of the 500 g cylinder, within experimental error.

The claims defining this invention are as follows:

1. A process of preparing a ceramic powder suitable for pressing into articles by the steps of
   (a) dispersing a particulate ceramic in water in the presence of ammonia or an alkylamine having a boiling point below that of water, present in a quantity sufficient to disperse the ceramic; and
   (b) spray-drying the resulting dispersion to give a ceramic powder.

2. A process according to claim 1, wherein the particulate ceramic has a particle size of 1 um maximum.

* * * * *